June 23, 1931.  J. C. TYNDALL  1,811,286
DRINKING CUP
Filed Aug. 13, 1927
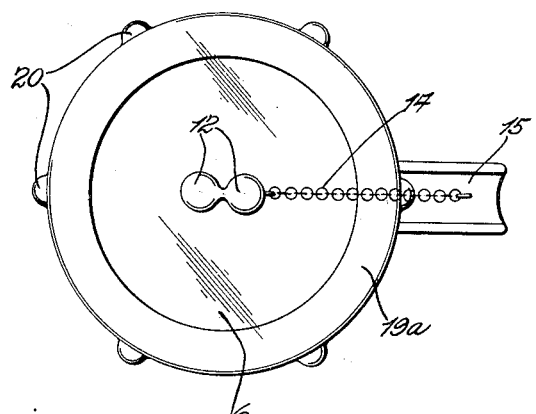
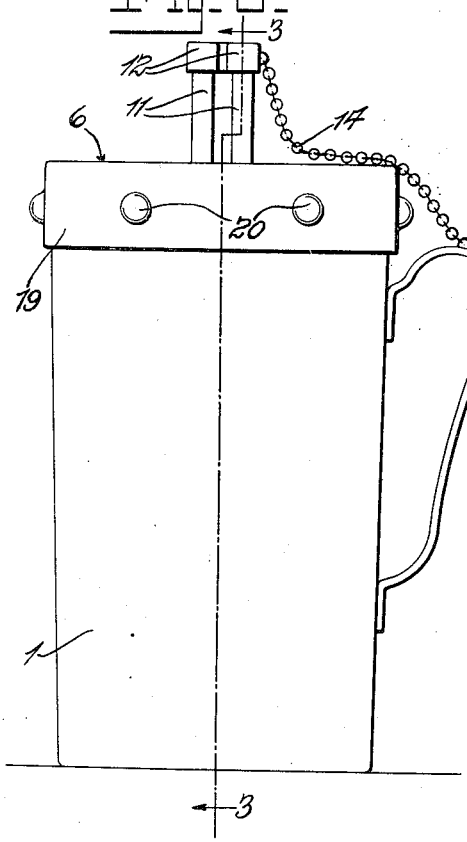
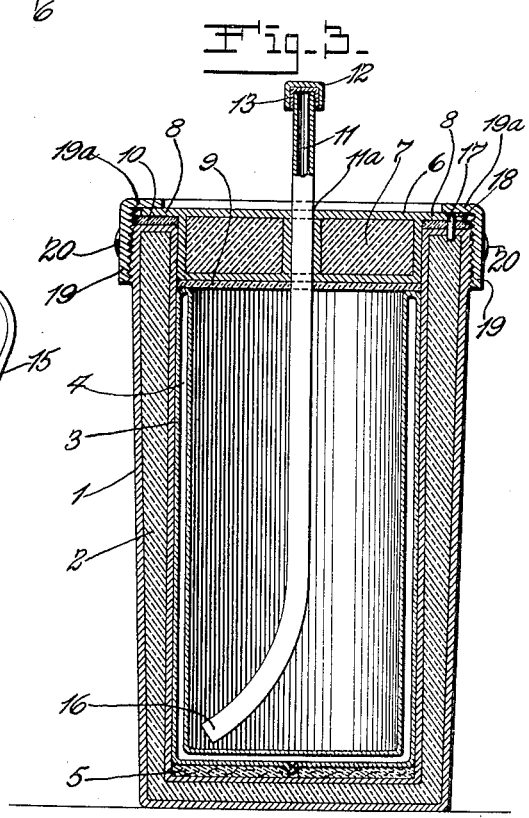
Inventor:
Jessie Carr Tyndall,
by J Henry Kinealy
Her Attorney.

Patented June 23, 1931

1,811,286

UNITED STATES PATENT OFFICE

JESSIE CARR TYNDALL, OF ST. LOUIS, MISSOURI

DRINKING CUP

Application filed August 13, 1927. Serial No. 212,680.

My invention relates to drinking cups and more particularly to drinking cups adapted for use in a hospital, sick room, on the train, or use under similar conditions.

Heretofore no convenient and satisfactory drinking cup has been deviced for use in the sick room and especially for patients whose condition renders them incapable of sitting up to drink. Usually glass drinking tubes have been used in an ordinary glass or cup but if the glass or cup is tilted even slightly the liquid therein will spill. Also, it is often desirable that the patient sip either warm or cold liquid over an extended period of time and such drinking vessels as have been provided included no means for maintaining the liquid at a uniform high or low temperature.

The objects of my invention are to provide a convenient, sanitary and useful drinking cup for use in sick rooms or other places where similar conditions exist and to provide a drinking cup which will maintain for several hours a liquid therein at substantially the temperature it was when introduced into the cup.

One embodiment of my invention is fully shown in the accompanying drawings wherein similar letters are used to designate similar parts and wherein Fig. 1 is a top view of the cup; Fig. 2 is a side elevation thereof and Fig. 3 is a sectional view along the lines 3—3 in Fig. 2.

Referring to the figures the drinking cup shown therein comprises an outer casing 1 which is arranged with outer and inner walls between which is included a suitable insulating material 2, preferably, asbestos. Within the casing 1 is a container 3 for liquid which, in this embodiment of my invention, includes outer and inner walls with a space 4 therebetween from which the air has been drawn so as to create a vacuum therein. The container 3 is, preferably, of glass or some other material impervious to air and water, and of such a size that it fits neatly in the casing 1 so as to be easily removed for washing when necessary, and is held away from the bottom of the casing 1 by a washer 5 of felt or other compressible material. The casing has a top 6 which is of a size to engage the inner side of the inner wall of the casing 1 and in the same manner as the casing 1, the top 6 preferably includes outer and inner walls with an insulation 7 therebetween. The top 6 has a shoulder 8 which extends peripherally outward from the upper edge thereof and is positioned to extend across the upper edge of the casing 1. The shoulder 8 is, preferably, provided with the downwardly extending pin 17 which is adapted to be positioned in a recess 18 in the upper edge of the casing 1 and when so positioned will prevent the top 6 from turning in the casing, for the purpose hereinafter explained. A retaining ring 19 is threaded on the upper marginal edge of the outer side of the outer wall of the casing 1 and the ring is formed with an inwardly extending portion 19$^a$ engaging the upper marginal surface of the shoulder 8 of the top whereby the top is maintained in position on the cup. The ring 19 is provided with a plurality of knobs 20 which are arranged to afford a firm grip on the ring when it is desired to screw it off or on the casing. On the underside of the top 6 is arranged a gasket 9 which may be of any suitable material but which I prefer be of rubber or similar material and which when the top 6 is in place and the ring 19 is screwed down on the casing will bear against and make a fluid tight engagement with the upper edge of the container 3. Likewise, the gasket 10 is provided between the upper edge of the casing 1 and the shoulder 8 of the top 6 to insulate these parts from one another and prevent the passage of air therebetween.

One or more tubes 11 are positioned in the openings 11$^a$ in the top 6 and are arranged to extend upwardly a short distance above the upper surface of the top 6 and to extend downwardly to nearly the bottom of the container 3, as shown in Fig. 3 and are otherwise adapted whereby a person may drink liquid therethrough from said cup. A cap 12 having cup-shaped parts on the inner side of which are included the washers 13 of rubber or similar material is normally positioned over the upper ends of the tubes 11 and the washers are arranged so that when the cap is in place on the tubes liquid is prevented from flowing therefrom. In order that the cap will not be lost when it is removed for the purposes outlined below it is, preferably, fastened by a chain 14 to the handle 15.

The use of the embodiment of my invention shown in the drawings and described above is as follows: The top 6 is removed after the ring 19 is unscrewed from the casing 1 and the liquid which it is desired that the patient drink is introduced into the container 3, the top 6 is put in place with the pin 17 in the recess 18 and the ring 19 is screwed down on top of the casing 1. When the top is put in place in the cup the lower face of the gasket 9 will engage the upper edge of the container 3 and when the ring 19 is screwed down a fluid tight engagement will be had between the top and the upper edge of the container. The bottom of the container 3 is cushioned on the resilient washer 5 so that even if the ring is screwed down too far the container will not be broken but the pressure will merely compress the washer 5. The pin 17 positioned in the recess 18 will, as stated, prevent the top from turning with the ring 19 when it is screwed down on the cup and, therefore, the container 3 will not be twisted in the casing and thereby render the container liable to be broken. Since the casing 1 is insulated and the container 3 is provided with the vacuum space 4, as described, and since, the top 6 is insulated and has a fluid tight contact with the top of the container 3 and with the top of the casing 1, as described, any liquid introduced into the container will be maintained for a considerable period of time at substantially the temperature it was at the time of such introduction. That is to say if it is desired to have the patient take intermittent drinks of a hot or cold liquid over a protracted period of time the temperature of the liquid will be maintained substantially constant for a long time and the full benefits of the treatment will be realized. When the patient desires to drink some of the liquid the cap 12 is removed from the upper ends of the tubes 11 and the patient draws liquid out through the tubes by sucking. As the drawing or sucking action of the patient is necessarily intermittent air will find its way downwardly through the tubes 11 in the intervals therebetween and, therefore, the creation of a vacuum in the container will be prevented.

The gasket 9 in addition to helping to maintain a constant temperature of the liquid in the container also prevents any of the liquid in the container from flowing over the upper edge of the container 3 and flowing downwardly between the outer wall of the container and the inner wall of the casing 1 or from flowing from the container in any other way except through the tubes 11 even if the cup is tilted or inverted in drinking.

Also, since when the cap 12 is in place on the tubes no liquid can flow therefrom, the cup when not being used will not spill or leak and, therefore, need not be handled carefully. I prefer, that the lower end 16 of the tubes 11 be bent, as shown in Fig. 3 in a plane substantially at right angles to the plane in which the handle 15 projects outwardly from the cup when the cup is held in the right hand and is used by a person for drinking so that almost all of the liquid in the container may be drawn through the tubes.

While, as stated above, only one embodiment of my invention has been shown, obviously, I do not intend to limit myself to the exact details of construction shown in the drawings since the size, shape and relative arrangement of the various parts may, of course, be changed within wide limits without deviating from the spirit of my invention as included in the claims below.

I claim:

1. A drinking cup, a drinking tube arranged and positioned with its lower end in said cup and near the bottom thereof and with its upper end outside of said cup and adapted whereby a person may drink liquid through said tube from said cup, and a top attached to said cup and said tube and otherwise arranged and positioned to prevent liquid from flowing from said cup except through said tube.

2. A drinking cup comprising a container for liquid, a drinking tube arranged and positioned with its lower end in said container and near the bottom thereof and with its upper end outside of said cup and adapted whereby a person may drink liquid through said tube from said container, a handle projecting outwardly from the side of said cup, and the lower end of said tube being bent towards the side of said container in a plane substantially at right angles to the plane in which said handle projects.

3. A drinking cup comprising a container for liquid, said container being insulated and otherwise arranged whereby it will maintain liquid introduced therein at substantially the temperature it was when introduced, a top for said cup, a drinking tube extending downwardly through said top and arranged and positioned with its lower end in said container and near the bottom thereof and with its upper end outside of said cup and adapted whereby a person may drink liquid through said tube from said container, and said top having a fluid tight engagement with said tube and said cup and otherwise arranged and positioned to prevent liquid from flowing from said cup except through said tube.

4. A drinking cup comprising a casing, a container for liquid positioned in said casing, and said casing and said container being insulated and arranged whereby liquid introduced into said container will be maintained at substantially the temperature it was when introduced, a tube arranged and positioned with its lower end in said container and near the bottom thereof and with its upper ends outside of said cup and adapted whereby a person may drink liquid through said tube from said container and a top for said cup attached thereto and to said tube and otherwise arranged and positioned to prevent liquid from flowing from said container except through said tube.

5. A drinking cup comprising a casing, a container for liquid positioned in said casing and said casing and said container being insulated and arranged whereby liquid introduced into said container will be maintained at substantially the temperature it was when introduced, a top for said cup arranged to have a fluid tight engagement with the upper edge of said container, and a tube extending downwardly through said top and having a fluid tight engagement therewith and arranged and positioned with its lower end in said container and near the bottom thereof and with its upper end outside of said cup and adapted whereby a person may drink liquid through said tube from said container.

6. A drinking cup, a drinking tube arranged and positioned with its lower end in said cup and its upper end outside of said cup and adapted whereby a person may drink liquid through said tube from said cup, a top for said cup, a handle projecting outwardly from the side of said cup, and the lower end of said tube being bent towards the side of said cup, and means for maintaining the bent portion of said tube in fixed position relative to the plane in which said handle projects.

7. A drinking cup comprising a casing, a removable container for liquid positioned in said casing and said casing and said container being insulated and arranged whereby liquid introduced into said container will be maintained at substantially the temperature it was when introduced, a washer of compressible material between the bottom of said container and said casing, a top for said cup arranged to have a fluid tight engagement between the lower face of said top and the upper edge of said container, a retaining ring for said top threaded on said casing, a plurality of tubes extending downwardly through said top and arranged and positioned with their lower ends in said container and near the bottom thereof and with their upper ends outside of said cup and adapted whereby a person may drink liquid through said tubes from said container, a handle projecting outwardly from the side of said cup, the lower ends of said tubes being bent towards the side of said container in a plane substantially at a right angle to the plane in which said handle projects, and a cap for covering the upper ends of said tubes so as to prevent liquid from flowing from said tubes when said cup is not being used for drinking.

In witness whereof I have signed my name to the foregoing specification.

JESSIE CARR TYNDALL.